(No Model.)
J. H. THIERMAN.
Apparatus for Aging Liquors.
No. 231,377. Patented Aug. 17, 1880.
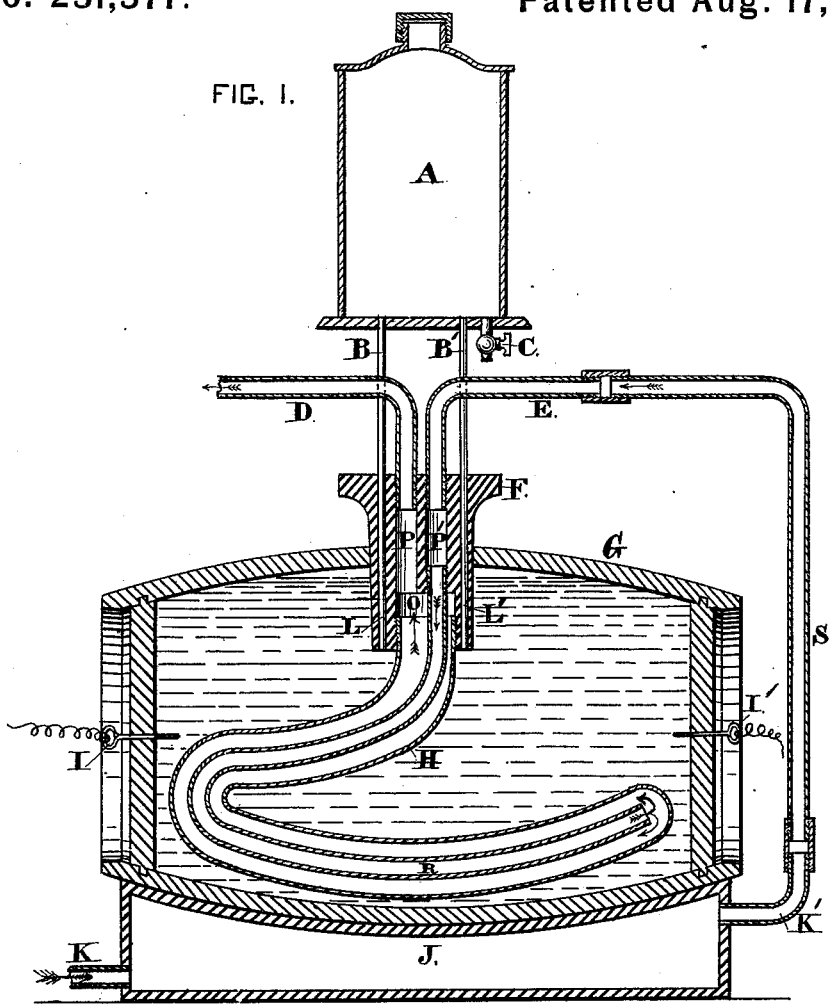
FIG. I.
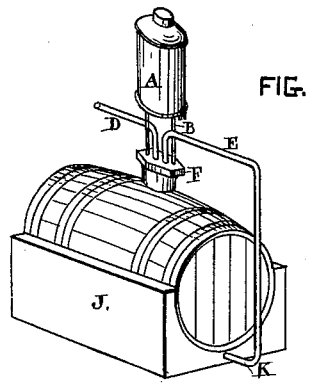
FIG. II.
WITNESSES:
T. J. Stewart
Fenton Jackson
INVENTOR.
John Henry Thierman
by J. S. Shortell
Attorney
N. PETERS, PHOTO-LITHOGRAPHER, WASHINGTON, D. C.

UNITED STATES PATENT OFFICE.

JOHN H. THIERMAN, OF LOUISVILLE, KENTUCKY.

APPARATUS FOR AGING LIQUORS.

SPECIFICATION forming part of Letters Patent No. 231,377, dated August 17, 1880.

Application filed April 14, 1880. (No model.)

*To all whom it may concern:*

Be it known that I, JOHN HENRY THIERMAN, residing at Louisville, in the county of Jefferson and State of Kentucky, have invented certain new and useful Improvements in Apparatus for Digesting, Mellowing, and Purifying Spirituous Liquors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a longitudinal section of my apparatus. Fig. 2 is a perspective view of same.

My invention relates to improvements in apparatus for digesting, mellowing, and purifying spirituous liquors and imparting to them the color, flavor, and other peculiarities of age when said liquor is contained in a cask, barrel, or like vessel, and has for its object to accomplish these results in a rapid, economic, and thorough manner, whereby the color, flavor, and mellowness usually attained by age is imparted to them when said liquor is contained in a cask, barrel, or like vessel charred or otherwise on its interior and favorably stored for one or more years; and it consists of an apparatus adapted to permit of the application of heat, produced either by an electric current or otherwise, within the body of the liquor to be digested, and at the same time externally to the containing-vessel when the said liquor is contained in a cask, barrel, or like vessel charred or otherwise on its interior surface, to promote the more rapid and economical digestion and thereby impart the color, flavor, and mellowness of age to the liquor without injury.

Spirituous liquors, newly distilled, are known to possess a disagreeable, raw, and unpleasant flavor and odor, given by an element in them termed "fusel-oil," and from verdigris, slop, and other matter, and to transform and remove which the liquor must be favorably stored for one or more years.

Experience shows that newly-distilled spirits, when contained in a cask or barrel charred or otherwise on its interior, and not more than two-thirds full, with the bung in, will, when favorably stored in a warm climate, rapidly improve and attain the color, flavor, and mellowness of age. In such case the solar heat acts as heating agent, promoting the digestion in the spirits, the absorption of oxygen and ozone from the air through the pores of and acids from the wood of the cask, and the volatilizing and transformation of the elements in it.

My invention is intended to embody all the principles of imparting the mellowness, color, flavor, and other peculiarities of age to distilled spirits which is attained by same contained in a cask or like vessel not more than two-thirds full, and charred or otherwise on its interior, with the bung in, and favorably stored during the summer months in a tropical or warm temperate climate.

Heretofore rocking frames, heating, and agitation, internally heating, agitating, and cooling alternately, &c., by mechanical agents have been employed to age spirits.

To carry out my invention I employ an apparatus substantially as shown in the drawings, and of which the following is a description.

A is a reservoir, made of copper or other similar metal, connected with bung F by pipes B B' and the interior of the cask by openings L L', said pipes being made of copper or other similar material. The reservoir or tank A is designed to be filled with the liquor also which communicates with that in the cask through pipes B B'.

C is a cock in the reservoir A, through which spirits are drawn to test the progress during treatment.

D is a pipe, of copper or other similar metal, screwed into bung F in the opening P, through which the cylinder H is discharged.

E is a pipe, of copper or other similar material, connected with bung F in the opening P', through which hot water is passed into R.

F is a metal bung, preferably of brass, made to fit air-tight in any bung-hole, and has the openings L L' P P' and cavity O drilled into it. G is a wooden cask or barrel.

H is a cylinder, of copper or other similar metal, closed at its lower end and open at its upper end, and is screwed into cavity O, and about two feet in length.

I I' are platinum electrodes inserted into the heads of cask G.

J is a hollow crescent-shaped jacket, made of iron, about two inches shorter than the cask or barrel, and adapted to permit of the cask resting thereon.

K K' are openings in jacket J, for permitting the entrance and discharge of the heating agent.

R is a pipe, of copper or other similar material, open at each end, inside of cylinder H, and screwed to bung F at P'.

S is a pipe or flexible hose connecting J with E. With such a similar apparatus hot air, hot water, or steam as the mechanical heating agent, (hot water never to reach the boiling-point answers my purpose the best,) and electricity may be employed to raise the temperature of and to produce the digestion in the spirits to be aged, the said spirits being contained in a cask, B, or like vessel charred or otherwise on its inner surface. (The ordinary whisky-barrel is best suited.)

To operate and carry out my invention the cask or barrel containing the liquor to be aged is placed on jacket J, and the cylindrical tube H (when the bung F is connected to A, D, E, H, and R) is inserted into the barrel through the bung-hole its full length, until the bung F fills up the bung-hole perfectly air-tight, as shown in the drawings. The jacket J is then connected by the flexible hose S with pipe E, and the electrodes I I' screwed into and through the heads of the barrel. Hot water is then conveyed into J at K, and, passing out at K', is conveyed through S, E, P', and R to the lower end of H, through which it passes, giving up its heat to the cask and the spirits, slowly raising the temperature of the liquor until it reaches 75° Fahrenheit, when the electricity is applied by attaching wires to I I' and connecting them with a battery conveniently placed, and the temperature of the liquor gradually and slowly raised until it reaches 100° Fahrenheit and upward, (not to exceed 170°,) and the water is discharged through the pipe D.

The temperature of the water at the commencement should not be more than 15° higher than that of the liquor, in order to prevent a sudden change in it, and it should never exceed 200° Fahrenheit.

When the temperature of the liquor has reached 110°, or such higher degree as may be preferred, but in no case to be sufficient to produce ebullition or agitation by boiling, it should be kept steadily at that point for a period of time from twenty-four hours to one-hundred and twenty hours, and after the expiration of which period the flow of hot water should be stopped and the battery disconnected to allow the expanded liquor in the reservoirs to return, at which time the aging is completed, and the apparatus may be withdrawn and the bung inserted into the bung-hole. The heat during the period causes the liquor to absorb oxygen through the pores of and acid from the wood of the cask, which, with the chemical and other effects produced by the electric current, induces digestion and the uniting, neutralizing, and purifying of the oils and substances in the liquor, thereby imparting the color, flavor, and mellowness of age to it.

The progress of the process should be tested from time to time during the period of treatment by drawing samples from the reservoir A through the cock C.

By the method above set out newly-distilled spirits may have the color, flavor, aroma, and mellowness of age imparted to them in a space of time from two to five days.

The advantages of my invention are its simplicity, completeness of apparatus, its easy management, the ready and quick application of the process, its economy. It is expeditious, and prevents the undue escape of essential oils, volatile and aromatic properties of the liquor, prevents loss or waste of the liquor by expansion or vaporizing during the operation, and it is continuous and complete in one application.

I find by experiment that the results of the process may nearly be obtained by the application of mechanical heat externally and electricity internally only, or by the internal application of mechanical and electric heat only, and that the convection, decomposition, and recomposition of the molecules or atoms of the liquor and its expansion by the mechanical and electric heat is sufficient.

I am aware that it is not new to age liquor by mechanical heat internally, or by mechanical heat while the containing-vessel is being agitated, or by alternately mechanically heating, agitating, and cooling internally; but,

Having thus described my invention, what I claim, and desire to secure by Letters Patent, is—

In an apparatus for aging spirituous liquors, the combination, with the cask G, having the bung F, provided with the parallel passages P P', of the pipe H, with its horizontal leg closed at one end, while its vertical leg is fitted in the inner end of the bung, pipe R, open at both ends and placed within the pipe H, and fitted at its upper end in one of the passages of the bung, and feed-pipe S E K', and discharge-pipe D, substantially as and for the purpose set forth.

In testimony whereof I affix my signature in presence of two witnesses.

JOHN HENRY THIERMAN.

Witnesses:
 FRANK PARDON,
 H. W. THIERMAN.